United States Patent [19]

Allmacher, Jr.

[11] 4,327,563
[45] May 4, 1982

[54] TORQUE-LIMITING DRIVE COUPLING

[76] Inventor: Daniel S. Allmacher, Jr., 38531 Manchester, Mt. Clemens, Mich. 48043

[21] Appl. No.: 92,197

[22] Filed: Nov. 7, 1979

[51] Int. Cl.³ .............................................. F16D 7/02
[52] U.S. Cl. ...................................... 464/37; 464/30; 464/100
[58] Field of Search ................. 64/30 D, 30 C, 30 E, 64/30 R, 29, 15 R, 27 L, 15 B; 198/781

[56] References Cited

U.S. PATENT DOCUMENTS

| | | | |
|---|---|---|---|
| 1,182,486 | 5/1916 | Hudson | 64/30 R |
| 1,962,993 | 6/1934 | Leece | 64/15 B |
| 2,826,903 | 3/1958 | Gerstung et al. | 64/29 |
| 2,883,840 | 4/1959 | Geiger, Jr. | 64/27 L |
| 3,802,222 | 4/1974 | Weber | 64/30 E |
| 3,942,338 | 3/1976 | Furlette et al. | 64/30 D |
| 4,056,953 | 11/1977 | Furlette et al. | 64/30 D |
| 4,143,525 | 3/1979 | Major | 64/30 D |

FOREIGN PATENT DOCUMENTS 2124538 11/1972 Fed. Rep. of Germany ..... 64/30 R

Primary Examiner—Charles J. Myhre
Assistant Examiner—Magdalen Moy
Attorney, Agent, or Firm—Jay C. Taylor

[57] ABSTRACT

This torque-limiting drive coupling in the annular hub of a drive sprocket has an oppositely-disposed pair of oblique internal notches in one of which is tightly seated one end of a steel driving leaf spring, the opposite end of which loosely fits the opposite notch. The central portion of this spring resiliently engages one of the flat sides of a hexagonal driven shaft for driven transmission of a conveyor roller mounted thereon under normal circumstances. This leaf spring, however, yields so as to slip over the corner ridges between the flat sides of the hexagonal shaft so as to permit the sprocket to continue rotation upon anti-friction bearings pressed therein while the shaft is halted or slowed by an obstacle, such as work accumulating on the rollers of an accumulating conveyor driven thereby. In a second form of the invention, the driving leaf spring at said one end is shaped like a numeral seven and is anchored in a similarly-shaped notch while in a third form that end terminates in an approximately rhombus-shaped loop and is driven into a similarly-shaped notch. In each form of the invention, the leaf spring is spaced away from the axis of rotation of the drive sprocket and driven hexagonal shaft.

9 Claims, 6 Drawing Figures

U.S. Patent May 4, 1982 4,327,563
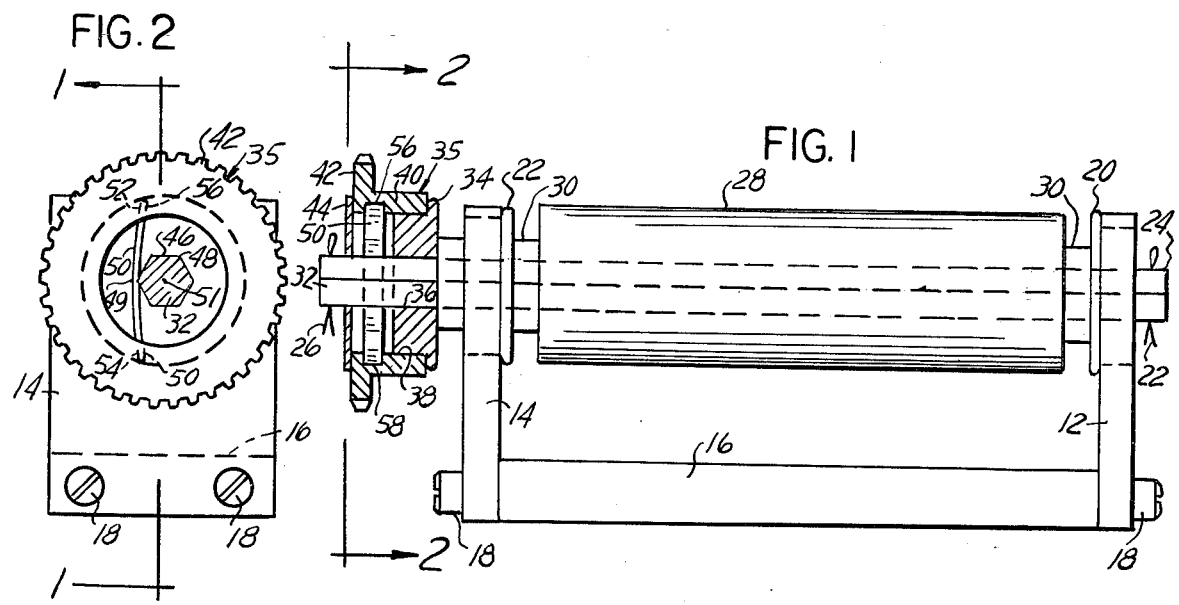
FIG. 2
FIG. 1
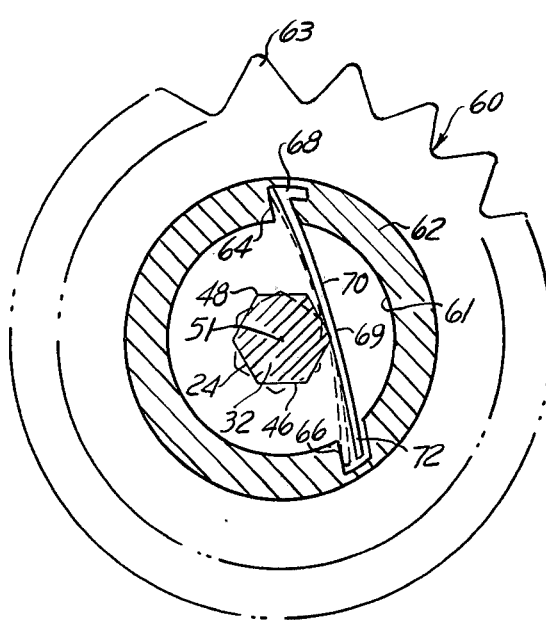
FIG. 4
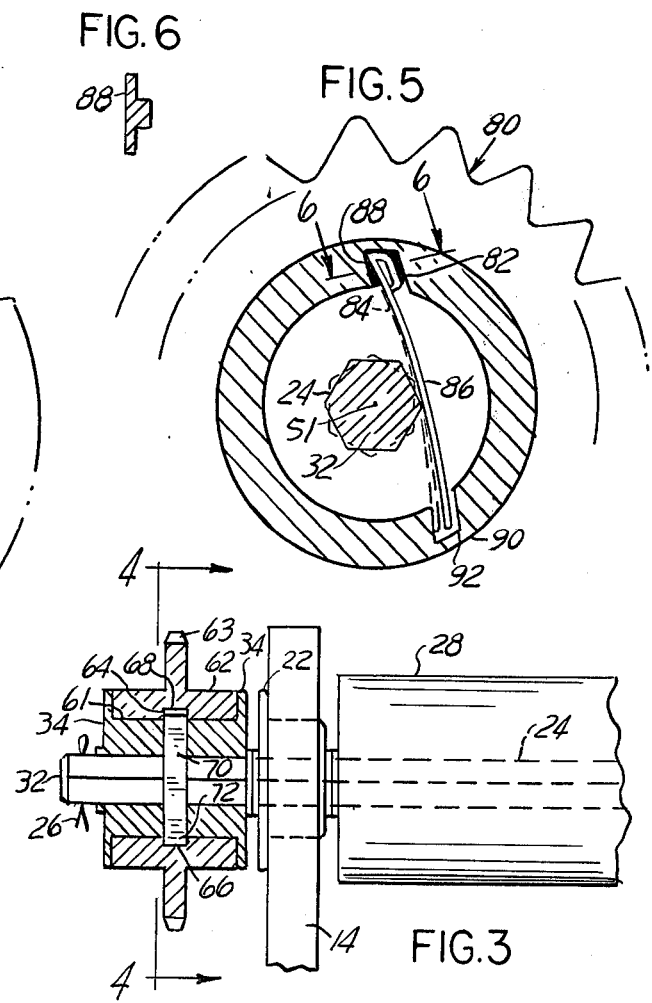
FIG. 6
FIG. 5
FIG. 3

TORQUE-LIMITING DRIVE COUPLING

SUMMARY OF THE INVENTION

The invention principally resides in the shape of the driving leaf spring engaging the flat hexagon shaft side and also in the anchorage of the fixed end of the leaf spring in its respective internal notch of the sprocket hub, in the three forms mentioned above.

In the drawings,

FIG. 1 is a front elevation of an accumulating conveyor roller assembly equipped with the torque-limiting coupling of the present invention, with the coupling in radial section along the line 1—1 in FIG. 2;

FIG. 2 is an end elevation, with the cover plate removed, of the accumulating conveyor shown in FIG. 1 in its slipping position, and taken along the line 2—2 in FIG. 1;

FIG. 3 is a fragmentary front elevation slightly enlarged of the left-hand end of FIG. 1, but showing a modified driving leaf spring;

FIG. 4 is an enlarged view of a cross-section of the modified coupling of FIG. 3, taken along the line 4—4 therein, with the slipping positions of the driving leaf spring and hexagonal shaft shown in dotted lines;

FIG. 5 is a cross-section similar to FIGS. 2 and 4, but showing a further modification of the driving leaf spring and its end anchoring notch; and FIG. 6 is a top plan view of the upper end of the driving leaf spring of FIG. 5, looking in the direction of the arrows 6—6 therein.

Referring to the drawings in detail, FIG. 1 shows in front elevation an accumulating conveyor roller unit, generally designated 10 as consisting of side members 12 and 14 disposed in spaced parallel relationship and interconnected by the base member 16 secured thereto by bolts 18. Mounted in the upper ends of the side members 12 and 14 are anti-friction bearings 20 and 22, such as roller bearings which rotationally support a driven shaft 24 of polygonal cross-section, such as a hexagonal driven shaft 24 drilled radially at its opposite ends to receive fasteners, such as cotter pins 26. Mounted upon and drivingly secured to the hexagonal shaft 24 is an accumulating conveyor roller 28 which is hollow and terminates at its opposite ends in hexagonally-bored or other polygonally-bored roll hubs 30 which receive the shaft 24. Projecting beyond the hub 30 adjacent the anti-friction bearing 22 in the side member 14 is the hexagonal outer end portion 32 of the driven hexagonal roller shaft 24. It will be understood that instead of the entire length of the roller shaft 24 being of hexagonal cross-section, it may be of circular cross-section between the antifriction bearings 20 and 22 with the roller 28 keyed or otherwise drivingly secured thereto and their respective end plates 12 and 14 with the end portion 32 alone being of hexagonal cross-section.

Mounted on the hexagonal projecting portion 32 of the shaft 24 is a torque-limiting drive coupling, generally designated 35 including an anti-friction bearing 34 having a hexagonal bore 36 mating with the hexagonal shaft portion 32. For the sake of simplicity of showing, the anti-friction bearing 34 is shown as a plain bearing, as is the case with the other such bearings described below. Rotatably mounted on the anti-friction bearing 34 is the inner surface 38 of the tubular hub 40 of a drive sprocket 42 which is driven in any suitable way by a sprocket chain (not shown) from an electric motor through a reduction gearset (also not shown). A cover plate 44 is mounted on the sprocket 42 and secured thereto in any suitable way as by fasteners (not shown).

Yieldingly engaging one of the flat sides 46 of the hexagonal outer portion 32 of the driven conveyor roller shaft 24 and adapted to slide over the corner ridges 48 therebetween is the approximate midportion or intermediate portion 49 of a torque-transmitting steel driving leaf spring 50, displaced laterally away from the axis of rotation 51 of the shaft 24 and sprocket 42, and preferably of steel. The opposite ends 52 and 54 of the leaf spring 50 are mounted in similarly-displaced internal recesses or notches 56 and 58 disposed in alignment with one another on opposite sides of the shaft portion 32 and recesses respectively in the tubular or hollow cylindrical hub 40 of the sprocket 32. The end 52 is press-fitted into its notch 56 whereas the end 54 is loosely received in the notch 58 with clearance therebetween. It will be understood that, as known to those skilled in the accumulating conveyor art, the portion of the accumulating conveyor roller assembly 10 of FIG. 1 between and including the side members 12 and 14 is duplicated in multiple assemblies stretching the length of the accumulating conveyor with the rolls 28 disposed in spaced locations along the conveyor layout.

In the operation of the torque-limiting coupling 35 and of the accumulating conveyor roller units 10, the workpieces forming the load to be conveyed rest on the upper sides of the rollers 28 and are carried along the length of the conveyor from the loading station to the discharge station (not shown) when power is applied to rotate the conveyor rollers 28. Such power is supplied normally from the motor or motors and reduction gearset or gearsets (not shown) through sprocket chains engaging the various drive sprockets 42, thereby causing this drive to be transmitted to the hexagonal outer portion 32 of each roll shaft 24 by means of the driving leaf springs 50 engaging the flat portions 46 of their respective hexagonal shaft portions 32. This driving action continues as long as the resistance to the passage of the work carried by the accumulating conveyor does not exceed a predetermined force determined by the resilience of the driving leaf springs 50.

If, however, the work conveyed by the conveyor accumulates at the discharge end thereof or for other reasons the conveyor encounters excessive resistance, so that the shaft or shafts 24 slow down or are halted, their flat surfaces 46 and intervening corner ridges 48 correspondingly slow down or halt. When this occurs, the sprockets 42 continue to rotate in response to the orbital motions of their respective sprocket chains driven through their reduction gearset from their respective motors, whereupon the sprocket hubs 40 likewise continue to rotate, carrying with them their respective notches 56 and 58 and consequently the adjacent ends 52 and 54 of the driving leaf springs 50. The latter, as a result, yield arcuately outward so as to push their way past the corner ridges 48 of the hexagonal outer shaft portions 32 until the obstruction or other cause of halting the conveyor rolls 28 is removed, whereupon each driving leaf spring 50 resumes its driving engagement with the nearest flat side 36 of the conveyor hexagonal outer portion 32 to effect driving engagement therebetween. In this way, the torque-limiting drive couplings 35 protect the accumulating conveyor and the work carried by it or the workman operating it from damage or injury.

The modified torque-limiting drive coupling, generally designated 60, shown in FIGS. 3 and 4, is generally similar to the torque-limiting drive coupling 35 shown in FIGS. 1 and 2, hence corresponding parts are designated with corresponding reference numerals. In the torque-limiting coupling 60, however, two antifriction bearings 34 are pressed into opposite ends of the bore 61 in the hub 62 of the drive sprocket 63. The sprocket hub 62 is provided with an internal recess or notch 64 of the shape, in cross-section, of the numeral seven, whereas the opposite recess or notch 66 is oblique and substantially straight. Seated in the numeral-seven-shaped notch 64 is the correspondingly-shaped end portion 68 of a shallowly-arcuate steel driving leaf spring 70, the opposite end 72 of which loosely fits into the oblique notch 66. The driving leaf spring 70 has an approximately flat intermediate portion 69 frictionally engaging one of the flat sides 46 of the hexagonal shaft portion 32. As before, the notches 64 and 66 and the correspnding ends 68 and 72 of the driving leaf spring 70 are displaced laterally away from the axis of rotation 51 of the outer portion 32 of the hexagonal shaft 24. The operation of the modified torque-limiting coupling 60 is otherwise so similar to that of the torque-limiting coupling 35 of FIGS. 1 and 2 as to require no additional description.

The further modified torque-limiting coupling, generally designated 80, shown in FIGS. 5 and 6 is also generally similar to the torque-limiting drive couplings 35 and 60 described above, hence corresponding parts are also designated with corresponding reference numerals. In the torque-limiting coupling 80, however, the notch 82 containing the fixed end 84 of the driving leaf spring 86 is not only oblique but is also approximately the shape of a rhombus into which is fitted the correspondingly-shaped looped end 88 of the driving leaf spring 86 into which the end 82 is press-fitted. The opposite end 90 of the driving leaf spring 86 is loosely received in its respective opposite notch 92 so as to be movable by a limited amount, as shown by the dotted lines. As before, the driving leaf spring 86 is displaced laterally from the axis of rotation 51 of the outer end portion 32 of the hexagonal shaft 24. The operation of the modified torque-limiting coupling 80 is also otherwise so similar to that of the torque-limiting coupling 35 of FIGS. 1 and 2 as to require no additional description.

It is believed to be self-evident from the foregoing description and drawing that the torque-limiting coupling of the present invention with its substantially flat midportion 49 of its single leaf spring 50 frictionally engaging one of the flat sides 46 of the hexagonal driven shaft portion 32 in surface-to-surface contact creates the maximum frictional holding force and effect therebetween with the minimum of working parts. The result is that the single leaf spring 50 of the present coupling performs an adequate frictional gripping effect by itself in contrast to the multiple springs and stacked assemblies thereof required in the prior art to frictionally engage a round shaft adequately in tangential line contact therebetween. Moreover, the arrangement of the present invention is consequently much simpler and involves fewer working parts than the above-mentioned prior art arrangements employing multiple springs engaging a round shaft. Finally, the torque-limiting coupling of the present invention instantly releases its grip when the midportion 49 of the leaf spring 50 passes from its frictional surface-to-surface engagement with the flat side 46 of the hexagonal shaft portion 32 and moves into line contact with the next-adjacent corner ridge 48 of the hexagonal shaft portion 32 when the accumulating conveyor roller 28 slows down or is halted by whatever cause, as explained above.

I claim:

1. A torque-limiting drive coupling, comprising driving and driven means rotatable coaxially, one of said means having a substantially flat surface spaced from and parallel to the axis of rotation, means for rotating the driven means in response to rotation of the driving means when the driving torque is less than a predetermined value and for enabling continued rotation of the driving means independently of the driven means when said torque exceeds said predetermined value comprising a torque-transmitting leaf spring extending from end to end transversely of said axis and having an intermediate portion in resiliently yieldable engagement with said flat surface, said flat surface and intermediate portion being in resiliently yieldable driving-driven engagement, the other of said means having surface portions confronting said axis, and means for maintaining said leaf spring in an operative position with respect to said driving and driven means and also for maintaining the engagement of said leaf spring adjacent its opposite ends at locations fixed circumferentially with respect to said surface portions comprising a pair of notches recessed into said surface portions adjacent the opposite ends of said leaf spring and having said opposite ends respectively confined therein, at least one of said ends being slidable endwise within its notch in response to flexing of said leaf spring during relative rotation between said driving and driven means.

2. A torque-limiting drive coupling, according to claim 1, wherein said notches are disposed obliquely to a radius drawn thereto from said axis of rotation.

3. A torque-limiting drive coupling, according to claim 1, wherein said driven means is a hexagonal driven member.

4. A torque-limiting drive coupling, according to claim 1, wherein one end of said leaf spring is closely confined within its respective notch and the other end of said leaf spring is loosely received within its respective notch.

5. A torque-limiting drive coupling, according to claim 4, wherein said one closely confined end is press fitted into its respective notch.

6. A torque-limiting drive coupling, according to claim 4, wherein said one closely confined end and its respective notch are of approximately numeral-seven configuration.

7. A torque-limiting drive coupling, according to claim 1, wherein said surface portions comprise an interior surface of said other means defining a space containing said one means, and said notches opening into said space.

8. A torque-limiting drive coupling, according to claim 4, wherein said closely confined end comprises a loop of approximately rhomboidal configuration integral with the remainder of said torque-transmitting leaf spring.

9. A torque-limiting drive coupling according to claim 7, wherein a line connecting said notches is spaced laterally from said axis.

* * * * *